(12) United States Patent
Serkh et al.

(10) Patent No.: US 6,293,885 B1
(45) Date of Patent: Sep. 25, 2001

(54) IDLER PULLEY

(75) Inventors: Alexander Serkh, Rochester Hills; Yahya Hodjat, Oxford, both of MI (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/525,607

(22) Filed: Mar. 14, 2000

(51) Int. Cl.[7] ........................................................ F16H 7/12
(52) U.S. Cl. ................................................ 474/199; 474/133
(58) Field of Search .................................. 474/135, 133, 474/199; 29/892, 892.3; 72/80, 81, 82, 83

(56) References Cited

U.S. PATENT DOCUMENTS

| 5,209,194 | 5/1993 | Adachi et al. ................... 123/90.17 |
| 5,272,889 | 12/1993 | Harris ........................................ 62/429 |
| 5,421,788 | 6/1995 | Toth ......................................... 474/135 |
| 5,462,489 | 10/1995 | Kan et al. ............................... 464/179 |
| 5,619,879 | * 4/1997 | Friese ......................................... 72/82 |
| 5,725,448 | 3/1998 | Kato et al. .............................. 474/43 |
| 5,841,113 | * 8/1999 | Kanemitsu et al. ..................... 72/82 |
| 5,897,214 | 4/1999 | Nisley ................................... 384/537 |
| 6,059,679 | * 5/2000 | Tsutsui et al. ....................... 474/135 |
| 6,241,257 | * 6/2001 | Hauck et al. ......................... 277/637 |

FOREIGN PATENT DOCUMENTS

| 57-110862 | * 7/1982 | (JP) ..................................... 29/892.3 |
| 62-151663 | * 7/1987 | (JP) ..................................... 474/170 |

* cited by examiner

Primary Examiner—Rodney H. Bonck
(74) Attorney, Agent, or Firm—J. A. Thurnau, Esq.; C. H. Castleman, Esq.; S. G. Austin, Esq.

(57) ABSTRACT

The invention comprises an idler pulley, having a web and a belt bearing surface connected to the web. The web is aligned with and affixed to an inner race outer surface of a bearing by a fastener. The pulley is stamped, formed or spun out of sheet metal and may have a central hole described by a lip for alignment with a central axis of the bearing. The outer race of the bearing may be affixed to a mounting surface.

25 Claims, 2 Drawing Sheets

IDLER PULLEY

FIELD OF THE INVENTION

The invention relates to pulleys, and more particularly to idler pulleys wherein the pulleys are stamped or formed out of sheet metal and are fixedly attached to an inner race of a bearing.

BACKGROUND OF THE INVENTION

Transmission of power by belt can be accomplished by a driver pulley and a single or series of driven pulleys about which a belt is trained. It is occasionally necessary for the belt to change direction as it operates between the driver and the driven in order to clear other components. In this case, the belt can be trained over idlers which allow the belt direction to be changed with minimal loss of efficiency. Further, for tensioning the belt, automatic tensioners can be used. In such case, the idler pulley is installed on the tensioner pivot arm.

Idlers generally comprise a base that is mounted on a non-rotating surface. The belt bearing surface or pulley is then rotatably connected to the base by means of a bearing. The bearing may be a ball bearing type having an inner and outer race. In most arrangements, the inner race of the ball bearing is attached to the idler base or to the non-rotating mounting surface directly. The idler pulley is then attached to the outer race of the ball bearing. The outer race and the pulley rotate together.

Representative of the art is U.S. Pat. No. 5,725,448 to Kato et al. which discloses such a pulley body fitted to an outer race of a ball bearing.

It is also possible to attach the pulley to the inner race of the ball bearing, with the outer race being fixedly attached to a mounting surface.

Representative of the art is U.S. Pat. No. 5,421,788 to Toth which discloses a belt tensioner having an idler pulley and bearing assembly. The idler pulley and bearing assembly comprise a non-rotating outer race and a pulley shaft extending through an inner race. The pulley is fitted to the inner race by means of the shaft, which shaft is pressed together with a retaining cup to hold the pulley shaft within the bearing inner race.

The prior art teaches a pulley shaft which is used to mount a pulley to a bearing race. This increases the cost of the idler with respect to the material cost as well as for machining and assembly.

What is needed is an idler pulley having a web mounted to an inner race of a bearing. What is needed is an idler pulley having a web affixed to an outer surface of an inner race of a bearing with a fastener. What is needed is an idler pulley having a web mounted to an inner race of a bearing with a lip for alignment. The present invention meets these needs.

SUMMARY OF THE INVENTION

The primary aspect of the present invention is to provide an idler pulley having a web mounted to an inner race of a bearing.

Another aspect of the invention is to provide an idler pulley having a web affixed to an outer surface of an inner race of a bearing with a fastener.

Another aspect of the invention is to provide an idler pulley having a web mounted to an inner race of a bearing with a lip for alignment.

Other aspects of the invention will be pointed out or made apparent by the following description of the invention and the accompanying drawings.

The invention comprises an idler pulley, the pulley having a web and a belt bearing surface connected to the web. The web is attached to an inner race of a bearing by a fastener. The pulley may be stamped out of sheet metal and may have a central hole for alignment with the central axis of the bearing. The outer race of the bearing is affixed to a mounting surface.

DESCRIPTION OF THE PREFERRED EMBODIMENTS OF THE INVENTION

Figure 1A:
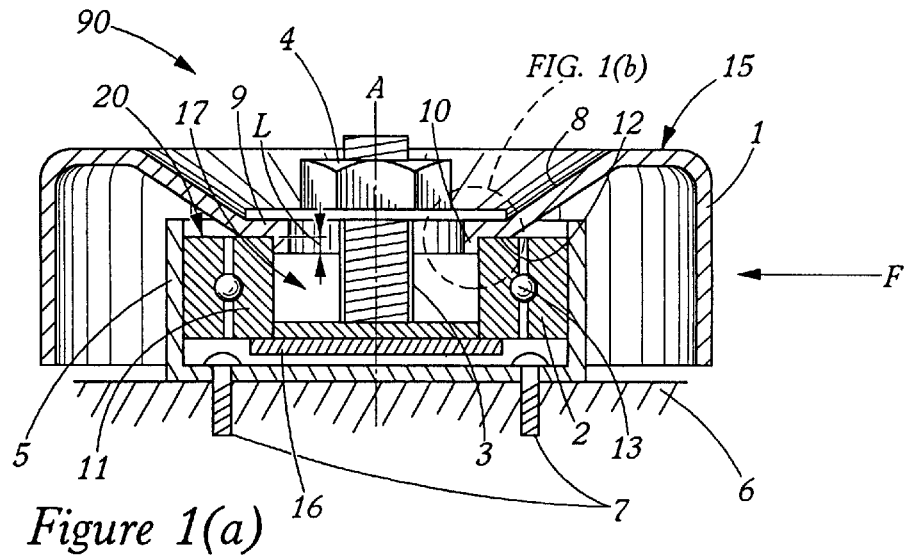
FIG. 1(a) depicts a cross-sectional elevation view of the invention.
Figure 5:
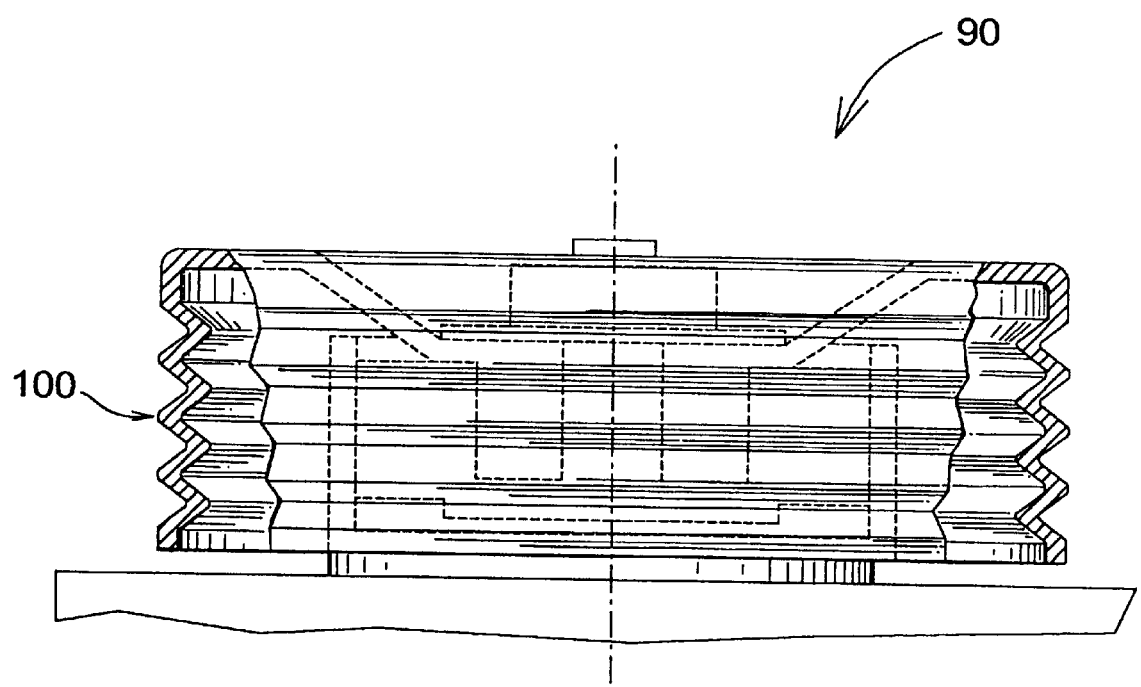
FIG. 5 depicts a cross-sectional view of an alternate belt bearing surface.

FIG. 1(a) depicts a cross-sectional elevation view of the invention 90. Idler pulley 90 comprises pulley 15. Pulley 15 comprises belt bearing surface 1 and web 8. Pulley 15 may comprise a "backside" pulley wherein belt bearing surface 1 is smooth. Pulley 15 may also comprise a multi-ribbed belt bearing surface 100, see FIG. 5. Belt bearing surface 1 describes a circular shape about a central axis. Pulley 15 also comprises land 9 and lip 10. Lip 10 extends normally or perpendicularly from land 9. Land 9 may also comprise an edge 19 that describes a hole. The hole is centered in the web 8. Land 9 has a width across the web and it encloses the centrally located hole. Fastener 3 may be installed through the central hole. Lip 10 may also extend obliquely from land 9 only as may be necessary to create an alignment and partial interference with inner race 11 for purposes of centering pulley 15 on central axis A, and for preventing lateral movement of pulley 15 from belt load F. Pulley 15 may be stamped out of sheet metal or be spun by metal forming processes known in the art. Web 8 may have a relief between land 9 and belt bearing surface 1 to enable the web 8 to clear the bearing or cup 5 to prevent web 8 from rubbing on outer race 2 during operation.

Bearing 20 comprises outer race 2, inner race 11, and ball bearings 13. Inner race 11 has outer surface 12 and describes inner race bore 17. Land 9 bears upon and is clamped to outer surface 12 by operation of fastener 3 and nut 4. Land 9 is formed to create a normal or perpendicular relationship between the belt bearing surface 1 and outer surface 12. In the preferred embodiment, inner surface 10 may comprise lip 10 that aligns pulley 15 within inner race bore 17, see FIG. 1(a). This, in turn, aligns belt bearing surface 1 parallel with a central axis A.

Figure 1B:
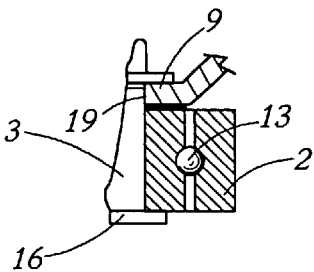
FIG. 1(b) depicts a detail of an alternate embodiment of the invention.

In a first alternate embodiment, inner surface 10 may also comprise surface 19 that may abut upon fastener 3. Surface 19 does not otherwise project or extend into inner race bore 17, see FIG. 1(b). FIG. 1(b) depicts a detail of an alternate embodiment of the invention.

In yet another alternate embodiment, surface 19 may not abut on any structure. Land 9 is affixed to and solely bears upon outer surface 12 with a fastener 3, and nut 4. In this alternate embodiment, belt bearing surface 1 and the central axis A are initially aligned during assembly, perhaps by use of an assembly jig. Bearing 20 is clamped or held in proper relation to the pulley 15. The radial position of belt bearing surface 1 with respect to central axis A is also set by use of a jig. This assures a proper coaxial arrangement between the belt bearing surface axis of rotation and the central axis. Once the proper radial position of belt bearing surface 1 and central axis A is achieved, fastener 3 and nut 4 are applied in order to clamp land 9 to outer surface 12.

Bearing 20 can be any known in the art that comprises an inner race and outer race that rotate in relation to each other. This may include, but be not limited to ball bearings, needle bearings, roller bearings, or sleeve type bearings. Bearing 20 may be self lubricating or require supplemental or forced lubrication.

Fastener 3, comprising a bolt, and a retainer comprising a nut 4, and flange 16 secure pulley 15 to inner race 11. Fastener 3 may also comprise a post having a flange 16 that cooperates with a snap ring (not shown) in lieu of a nut. Fastener 3 does not necessarily function as a means to align pulley 15 with central axis A. Bolt 3 and nut 4 simply secure land 9 to the inner race outer surface 12. Alignment of belt bearing surface 1 with inner race outer surface 12 and central axis A may be accomplished as described above or by lip 10 engaging inner race 11. Lip 10 is of a minimal length, L, which length being sufficient to hold pulley 15 in proper position with inner race 11 and central axis A when belt load F is applied to the idler pulley. Pulley 15 is also held in place by the clamping force of the fastener 3, 4 on land 9. Proper alignment of belt bearing surface 1 and inner race 11 is achieved by the perpendicularity of belt bearing surface 1 and land 9, and whereby land 9 is affixed to outer surface 12.

Figure 4:
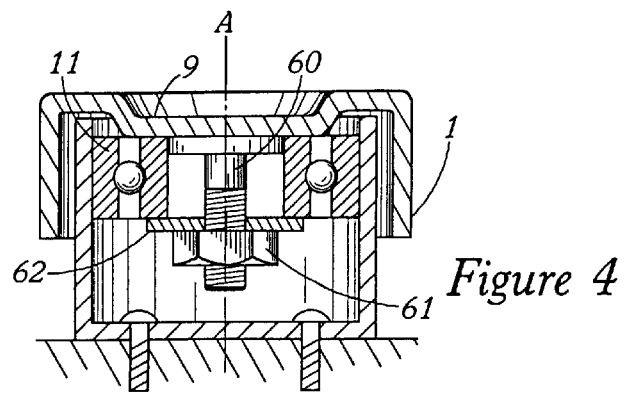
FIG. 4 depict a cross-sectional view of an alternate embodiment.

FIG. 4 depict a cross-sectional view of an alternate embodiment. In the alternate embodiment, web 8 defines no central hole. Instead, a fastener post or bolt 60 extends from land 9, perpendicular or normal to web 8. Fastener 60 extends through the inner race bore 17 in a substantially co-axial manner with central axis A. A nut or retainer 61 is then attached to the end of fastener 60 to affix pulley 15 in the inner race 11. Nut 61 may also comprise flange 62 to facilitate assembly with the inner race 11.

Bearing outer race 2 is secured to a mounting surface 6. In the preferred embodiment, outer race 2 is pressed into cup 5. Cup 5 may be attached to the mounting surface 6 by fasteners 7, or by any other method known in the art. Fasteners 7 may comprise bolts or rivets or any other appropriate type of fastener known in the art, including welding the cup to the mounting surface. Cup 5 may also be an integral part of the mounting surface, for example, as a result of being cast with the mounting surface. Mounting surface 6 may be located on a pivot arm for a belt tensioner or on the accessory drive surfaces of a motor or engine, including for example, an automobile engine, or any other surface suitable for supporting an idler pulley.

In the preferred embodiment, pulley 15 rotates with inner race 11 while outer race 2 remains stationary. Holding the outer race 2 stationary significantly reduces the race velocity and therefore the velocity of the ball bearings. This in turn significantly reduces bearing wear and decreases lubrication requirements.

Figure 2:
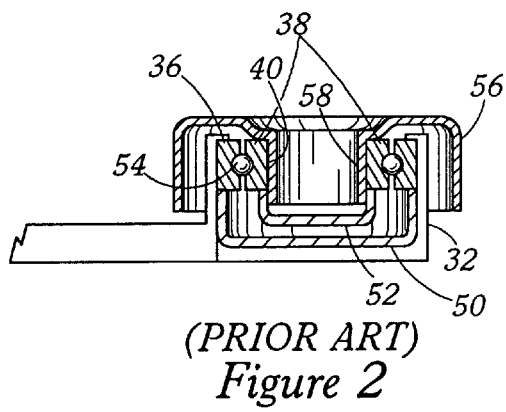
FIG. 2 depicts a prior art idler pulley.

FIG. 2 depicts a prior art idler pulley. Pulley 56 comprises shaft 58 which fits into and extends through inner race annular opening 40. A ball bearing comprises inner race 38, outer race 36 and ball bearings 54. Outer race 36 is pressed into receiving cup 32. Retaining cup 52 is pressed over the end of shaft 58 in order to hold shaft 58 within annular opening 40. Retainer 50 is then pressed into receiving cup 32 to hold outer race 36 within receiving cup 32.

Figure 3:
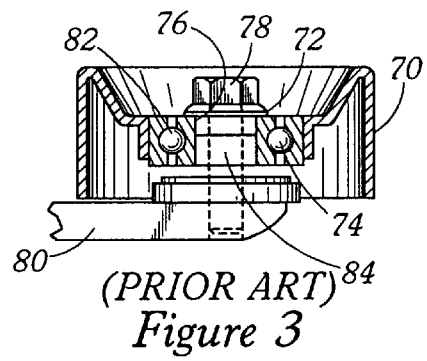
FIG. 3 also depicts another prior art idler pulley.

FIG. 3 also depicts another prior art idler pulley. Nut 78 mounted on bolt 84 holds ball bearing inner race 72 in place on a mounting surface 80. Pulley 70 is mounted on outer race 74. Pulley 70 rotates with outer race 74 about inner race 72.

Although a single form of the invention has been described herein, it will be obvious to those skilled in the art that variations may be made in the construction and relation of parts without departing from the spirit and scope of the invention described herein.

We claim:

1. An idler pulley comprising:
   a belt bearing surface;
   a web connected to the belt bearing surface, the web having a plane normal to the belt bearing surface and having a land portion having a width and being substantially centered in the web;
   the land portion describing a hole for engaging a fastener;
   a bearing having an inner race and an outer race, the inner race having an outer surface normal to a central axis and having an inner race bore; and
   the land portion affixed to the outer surface, whereby the belt bearing surface is substantially perpendicular to the outer surface.

2. The idler pulley as in claim 1, further comprising;
   a fastener extending perpendicular to the land portion;
   a retainer cooperating with the fastener whereby the land is affixed to the inner race with the fastener and whereby the belt bearing surface is substantially concentric with a central axis.

3. The idler pulley as in claim 2, wherein the outer race is mounted to a surface.

4. The idler pulley as in claim 2, wherein the web and belt bearing surface are a single piece stamped out of sheet metal.

5. The idler pulley as in claim 2, wherein the web and belt bearing surface are a single piece spun by metal forming.

6. The idler pulley as in claim 2, wherein the bearing is self lubricating.

7. The idler pulley as in claim 2, wherein the belt bearing surface describes a substantially flat profile.

8. The idler pulley as in claim 2, wherein the belt bearing surface describes a multi-ribbed profile.

9. An idler pulley comprising:
   a belt bearing surface describing a circular shape;
   a web connected to the belt bearing surface, the web having a plane normal to the belt bearing surface and having a land portion having a width and being substantially centered in the web;
   a bearing having an inner race and an outer race, the inner race having an outer surface normal to a central axis and having an inner race bore;
   the land portion affixed to the outer surface, whereby the belt bearing surface is substantially perpendicular to the outer surface;
   an edge describing a hole, the hole being enclosed by the land portion and the hole being substantially centered in the web;
   a fastener extending through the hole and bearing on the land; and
   a retainer cooperating with the fastener affixing the land to the outer surface.

10. The idler pulley as in claim 9, wherein the edge portion further comprises:

a lip portion extending at an angle to the land portion;

the lip portion cooperating with the inner race bore, whereby the web is substantially parallel the outer surface.

11. The idler pulley as in claim 10, wherein the outer race is mounted to a surface.

12. The idler pulley as in claim 10, wherein the web and belt bearing surface are a single piece stamped out of sheet metal.

13. The idler pulley as in claim 10, wherein the web and belt bearing surface are a single piece spun by metal forming.

14. The idler pulley as in claim 10, wherein the bearing is self lubricating.

15. The idler pulley as in claim 10, wherein the belt bearing surface describes a substantially flat profile.

16. The idler pulley as in claim 10, wherein the belt bearing surface describes a multi-ribbed profile.

17. The idler pulley as in claim 9, wherein the outer race is mounted to a surface.

18. The idler pulley as in claim 9, wherein the web and belt bearing surface are a single piece stamped out of sheet metal.

19. An idler pulley comprising:

a belt bearing surface;

a web connected to the belt bearing surface, the web having a land portion having a width and being substantially centered in the web;

a bearing having an inner race and an outer race, the inner race having an outer surface normal to a central axis and having an inner race bore;

the land portion engaged with the outer surface, whereby the belt bearing surface is substantially perpendicular to the outer surface; and a threaded fastener extending perpendicular to the land portion and cooperating with a retainer affixing the land portion to the outer surface.

20. The idler pulley as in claim 19, wherein the land portion further comprises:

a lip portion extending at an angle to the land portion; and the lip portion cooperating with the inner race bore.

21. The idler pulley as in claim 19, wherein the outer race is mounted to a surface.

22. The idler pulley as in claim 19, wherein the belt bearing surface further comprises a multi-ribbed profile.

23. An idler pulley comprising:

a belt bearing surface describing a circular shape;

a web connected to the belt bearing surface, the web having a land portion substantially centered in the web;

a bearing having a central axis and having an inner race and an outer race, the inner race having an outer surface and having an inner race bore;

the land portion engaged with the outer surface, whereby the belt bearing surface is substantially concentric with the central axis; and a threaded fastener extending through the inner race bore affixing the land portion to the outer surface.

24. The idler pulley as in claim 23, wherein the land portion further comprises:

a lip portion extending at an angle to the land portion; and the lip portion cooperating with the inner race bore.

25. The idler pulley as in claim 23, wherein the belt bearing surface further comprises a multi-ribbed profile.

* * * * *

UNITED STATES PATENT AND TRADEMARK OFFICE
CERTIFICATE OF CORRECTION

PATENT NO.    : 6,293,885 B1
DATED         : September 25, 2001
INVENTOR(S)   : Alexander Serkh and Yahya Hodjat It is certified that error appears in the above-identified patent and that said Letters Patent is hereby corrected as shown below:

<u>Title page,</u>
Item [75], Inventors, please substitute the following: -- Alexander Serkh, Troy; Yahya Hodjat, Oxford, both of MI (US) --

Signed and Sealed this

Twenty-sixth Day of November, 2002

*Attest:*

*Attesting Officer*

JAMES E. ROGAN
*Director of the United States Patent and Trademark Office*